(12) United States Patent
Hikita et al.

(10) Patent No.: US 7,757,122 B2
(45) Date of Patent: Jul. 13, 2010

(54) REMOTE MAINTENANCE SYSTEM, MAIL CONNECT CONFIRMATION METHOD, MAIL CONNECT CONFIRMATION PROGRAM AND MAIL TRANSMISSION ENVIRONMENT DIAGNOSIS PROGRAM

(75) Inventors: Tomohiro Hikita, Kawasaki (JP);
Yoshihiro Kimura, Kawasaki (JP);
Ikuko Tachibana, Kawasaki (JP);
Toshiaki Hayashi, Kawasaki (JP);
Takashi Tanifuji, Kawasaki (JP);
Keisuke Horigami, Kawasaki (JP);
Yasutaka Tanikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 704 days.

(21) Appl. No.: 11/341,671

(22) Filed: Jan. 27, 2006

(65) Prior Publication Data
US 2007/0174742 A1    Jul. 26, 2007

(30) Foreign Application Priority Data
Oct. 13, 2005   (JP)   ............................. 2005-298477

(51) Int. Cl.
*G06F 11/00* (2006.01)
(52) U.S. Cl. ............................ 714/27; 714/4; 714/48; 714/57; 709/206
(58) Field of Classification Search .................. 714/27, 714/4, 48, 57; 709/206
See application file for complete search history.

(56) References Cited

U.S. PATENT DOCUMENTS

| | | | |
|---|---|---|---|
| 5,644,706 A * | 7/1997 | Ruigrok et al. | 714/48 |
| 6,035,295 A * | 3/2000 | Klein | 707/6 |
| 6,189,056 B1 * | 2/2001 | Ogura et al. | 710/62 |
| 6,275,849 B1 * | 8/2001 | Ludwig | 709/206 |
| 6,336,138 B1 * | 1/2002 | Caswell et al. | 709/223 |
| 6,631,247 B1 * | 10/2003 | Motoyama et al. | 399/8 |
| 6,823,367 B1 * | 11/2004 | Wakasugi et al. | 709/206 |
| 7,016,064 B2 * | 3/2006 | Iida et al. | 358/1.15 |
| 7,080,285 B2 * | 7/2006 | Kosugi et al. | 714/36 |
| 7,230,733 B2 * | 6/2007 | Adegawa | 358/1.15 |
| 7,450,742 B2 * | 11/2008 | Shimizu et al. | 382/128 |
| 7,492,970 B2 * | 2/2009 | Saito et al. | 382/305 |
| 7,500,143 B2 * | 3/2009 | Buia et al. | 714/26 |
| 7,558,983 B2 * | 7/2009 | Tanimoto | 714/18 |
| 2002/0006790 A1 * | 1/2002 | Blumenstock et al. | 455/423 |
| 2002/0112008 A1 * | 8/2002 | Christenson et al. | 709/206 |
| 2003/0037287 A1 * | 2/2003 | Nakamura et al. | 714/30 |
| 2003/0046354 A1 * | 3/2003 | Mizuno | 709/206 |

(Continued)

FOREIGN PATENT DOCUMENTS

JP        2002-55850       2/2002

*Primary Examiner*—Scott T. Baderman
*Assistant Examiner*—Loan Lam To Truong
(74) *Attorney, Agent, or Firm*—Katten Muchin Rosenman LLP

(57) ABSTRACT

When a fault is detected by a surveillance agent mounted in a user device, fault information is reported to a maintenance center device by an electronic mail through an internet. The user device is provided with a connect confirmation unit to prepare and transmit connect confirmation mails of a plurality of patterns different in mail content, and the maintenance center device is provided with a diagnosis unit, which diagnose a mail transmission environment of the user device from the reception result of one or a plurality of connect confirmation mails received within a fixed period of time and transmits a diagnosis result to the user device by the electronic mail.

20 Claims, 16 Drawing Sheets

U.S. PATENT DOCUMENTS

| | | | |
|---|---|---|---|
| 2004/0034692 A1* | 2/2004 | Eguchi et al. | 709/206 |
| 2004/0059789 A1* | 3/2004 | Shum | 709/206 |
| 2004/0073618 A1* | 4/2004 | Okuno | 709/206 |
| 2004/0078783 A1* | 4/2004 | Matsushima | 717/126 |
| 2005/0027781 A1* | 2/2005 | Curry et al. | 709/200 |
| 2005/0131656 A1* | 6/2005 | Ikeda et al. | 702/188 |
| 2005/0165929 A1* | 7/2005 | Motoyama | 709/224 |
| 2005/0188035 A1* | 8/2005 | Ueno | 709/206 |
| 2005/0273658 A1* | 12/2005 | Wachi | 714/25 |
| 2006/0075277 A1* | 4/2006 | Johnson et al. | 714/4 |
| 2006/0168004 A1* | 7/2006 | Choe et al. | 709/206 |

* cited by examiner

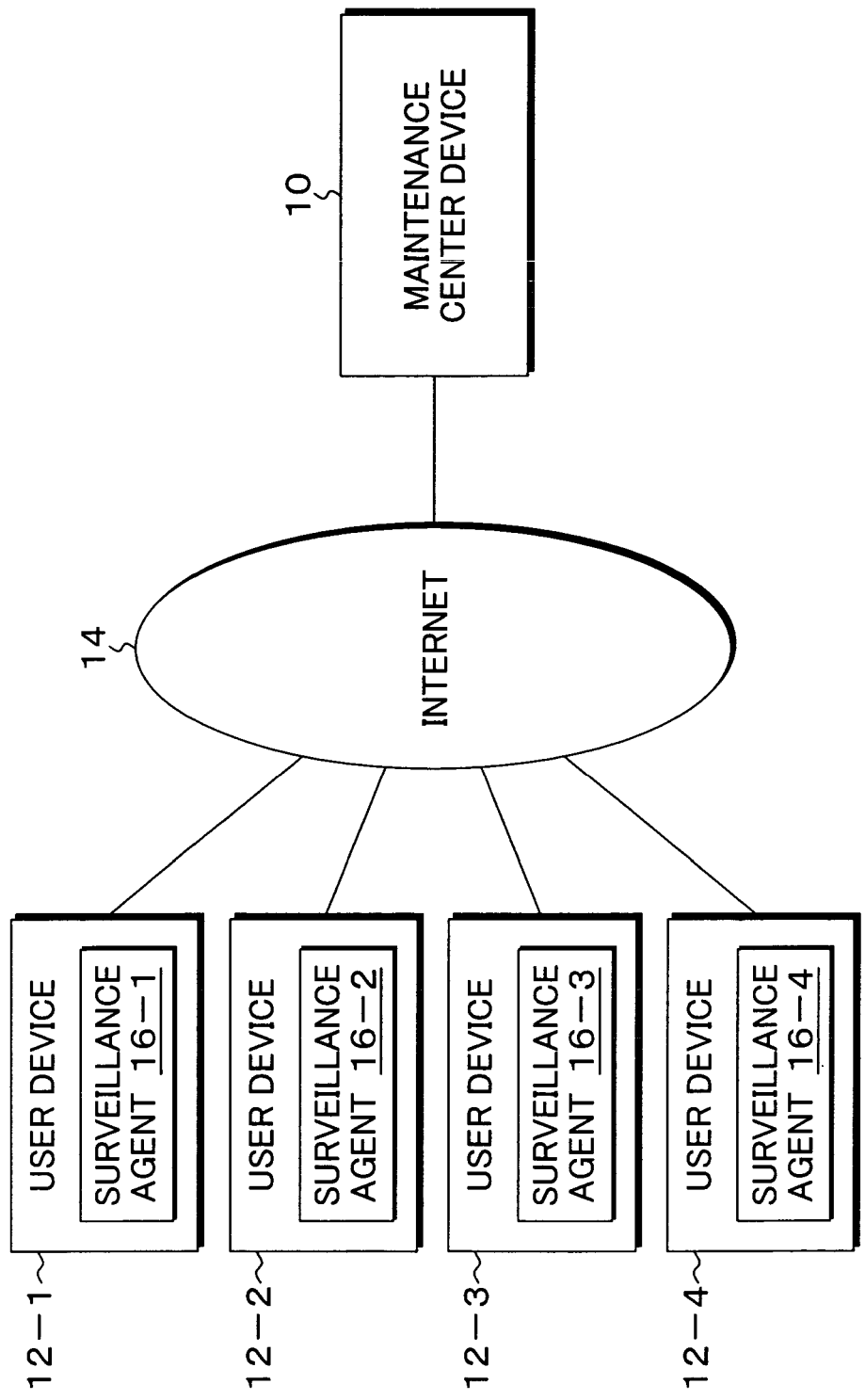

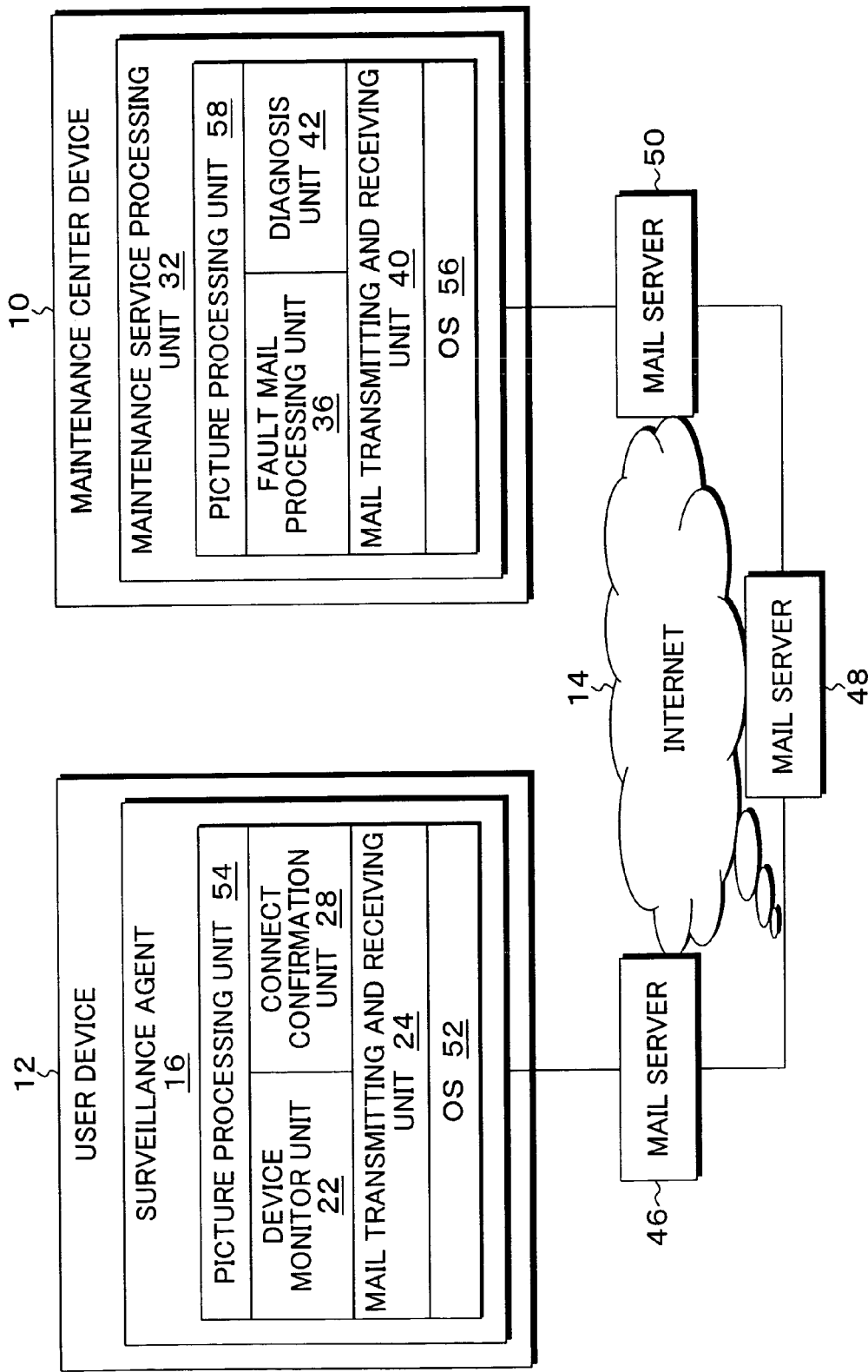

FIG. 7

| CHECK PATTERN 82 | CONTENT OF CONNECT CONFIRMATION 84 | TRANSMISSION SIZE 86 | SIGN 88 | ATTACHED FILE 90 |
|---|---|---|---|---|
| FIRST CONNECT CONFIRMATION MAIL | MAIL HAVING SIZE UNPARTITIONABLE | BELOW PARTITIONABLE SIZE (64Kb) | SMALL | NOT AVAILABLE |
| SECOND CONNECT CONFIRMATION MAIL | MAIL HAVING SIZE PARTITIONABLE | ABOVE PARTITIONABLE SIZE (64Kb) 64~128Kb | PARTIAL | AVAILABLE |
| THIRD CONNECT CONFIRMATION MAIL | MAIL TRANSMITTING PARTITIONABLE SIZE WITHOUT PARTITION | 2Mb | LARGE | AVAILABLE |

| 94 | 96 SET UP OF MAIL TRANSMISSION ENVIRONMENT | 92 TYPE AND SEQUENCE OF CONNECT CONFIRMATION MAIL 98 |
|---|---|---|
| COMBINATION TRANSMISSION PATTERN | | |
| PARTITIONED CONFIRMATION PATTERN | PARTITION AVAILABLE | FIRST CONNECT CONFIRMATION MAIL + SECOND CONNECT CONFIRMATION MAIL |
| SIZE LIMIT CONFIRMATION PATTERN | PARTITION NOT AVAILABLE | FIRST CONNECT CONFIRMATION MAIL + THIRD CONNECT CONFIRMATION MAIL |

FIG. 10

| | CENTER RECEPTION RESULT (○:NORMAL RECEPTION, ✕:NOT RECEIVED WITHIN N MINUTES) | | |
|---|---|---|---|
| | CASE 1 | CASE 2 | CASE 3 |
| FIRST CONNECT CONFIRMATION MAIL | ○ | ○ | ✕ |
| SECOND CONNECT CONFIRMATION MAIL | ○ | ✕ | ○ |
| SUPPOSED TRANSMISSION MAIL ENVIRONMENT | NO PROBLEM | PARTITIONED MAIL LIMIT AVAILABLE | USUALLY NOT POSSIBLE |
| COUNTER MEASURE | NOT REQUIRED | SET TO PARTION MAIL NOT AVAILABLE | REVIEW CHECK ENVIRONMENT OF ERROR MAIL |

| | CENTER RECEPTION RESULT (○:NORMAL RECEPTION, ✕:NOT RECEIVED WITHIN N MINUTES) | | |
|---|---|---|---|
| | CASE 4 | CASE 5 | CASE 6 |
| FIRST CONNECT CONFIRMATION MAIL | ○ | ○ | ✕ |
| THIRD CONNECT CONFIRMATION MAIL | ○ | ✕ | ○ |
| SUPPOSED TRANSMISSION MAIL ENVIRONMENT | NO PROBLEM | PARTITIONED MAIL LIMIT AVAILABLE | USUALLY NOT POSSIBLE |
| COUNTER MEASURE | NOT REQUIRED | SET TO PARTION MAIL NOT AVAILABLE | REVIEW CHECK ENVIRONMENT OF ERROR MAIL |

FIG. 12

Subject: REMOTE CONNECT CHECK (SUCCESS)  ← 116-1

[TERMINATING POINT]
"COMPANY NAME"
ATT : MR.xxx, MANAGER dd DATE, mm MONTH, yyyy YEAR
"NAME OF AFFILIATION"

[ORIGINATING POINT]
○○ CLIENT REGISTRATION CENTER
TEL  0120-xxx-xxx

REMOTE CONNECT COMPLETION NOTICE SLIP

CENTER RECEPTION DATA : JUNE 8, 2005, 16:50 HRS

PLEASE BE ADVISED THAT CONNECT OF REMOTE MAINTENANCE FUNCTION HAS BEEN COMPLETED ON THE FOLLOWING EQUIPMENT.

118-1

[SITE INFORMATION]
MODEL NAME [--------]  PRODUCTION NUMBER [--------]  BLADE NUMBER [XXXX]
UNIQUE NAME [ ]
EVENT DATE [hh HOUR  mm MINUTE  dd DATE  mm MONTH  yyyy YEAR]

120-1

[DIAGNOSIS RESULT]
MAIL SETUP [PARTITION AVAILABLE]
RESULT [SUCCESS (SMALL=OK, PARTIAL=OK)]

Subject: REMOTE CONNECT CHECK (NG)

[TERMINATING POINT]
"COMPANY NAME"
ATT : MR.xxx, MANAGER dd DATE, mm MONTH, yyyy YEAR
"NAME OF AFFILIATION"

[ORIGINATING POINT]
○○ CLIENT REGISTRATION CENTER
TEL 0120-xxx-xxx

REMOTE CONNECT COMPLETION NOTICE SLIP (FAILURE)

CENTER RECEPTION DATA : JUNE 8, 2005, 16:50 HRS

PLEASE BE ADVISED THAT CONNECT TEST OF REMOTE MAINTENANCE FUNCTION HAS BEEN EXECUTED BUT FAILED ON THE FOLLOWING EQUIPMENT. PLEASE TAKE NECESSARY MEASURES TO MEET THE SITUATION WITH REFERENCE TO DIAGNOSIS RESULT.

[SITE INFORMATION]
MODEL NAME [------] PRODUCTION NUMBER [------] BLADE NUMBER [XXXX]
UNIQUE NAME [ ]
EVENT DATE [hh HOUR mm MINUTE dd DATE mm MONTH yyyy YEAR]

[DIAGNOSIS RESULT]
MAIL SETUP [PARTITION AVAILABLE]
RESULT [FAILURE (SMALL=OK, PARTIAL=NG)]
COUNTER MEASURES [PLEASE SET UP TO MAIL PARTITION NOT AVAILABLE AND EXECUTE CONNECT CONFIRMATION AGAIN]

FIG. 14

```
Subject: REMOTE CONNECT CHECK (SUCCESS)
```
124-1

[TERMINATING POINT]                               dd DATE, mm MONTH, yyyy YEAR
"COMPANY NAME"                                           "NAME OF AFFILIATION"
ATT : MR.xxx, MANAGER
                                                  [ORIGINATING POINT]
                                                  ○○ CLIENT REGISTRATION CENTER
                                                  TEL  0120-xxx-xxx

REMOTE CONNECT COMPLETION NOTICE SLIP

CENTER RECEPTION DATA : JUNE 8, 2005, 16:50 HRS

PLEASE BE ADVISED THAT CONNECT OF REMOTE MAINTENANCE FUNCTION HAS BEEN
COMPLETED ON THE FOLLOWING EQUIPMENT.

126-1

[SITE INFORMATION]
MODEL NAME [------]     PRODUCTION NUMBER [------]    BLADE NUMBER [XXXX]
UNIQUE NAME [ ]
EVENT DATE [hh HOUR  mm MINUTE  dd DATE  mm MONTH  yyyy YEAR]

128-1

[DIAGNOSIS RESULT]
MAIL SETUP [PARTITION AVAILABLE]
RESULT [SUCCESS (SMALL=OK, LARGE=OK)]

Subject: REMOTE CONNECT CHECK (NG)

[TERMINATING POINT]
"COMPANY NAME"
ATT : MR.xxx, MANAGER dd DATE, mm MONTH, yyyy YEAR
"NAME OF AFFILIATION"

[ORIGINATING POINT]
○○ CLIENT REGISTRATION CENTER
TEL  0120-xxx-xxx

REMOTE CONNECT COMPLETION NOTICE SLIP (FAILURE)

CENTER RECEPTION DATA : JUNE 8, 2005, 16:50 HRS

PLEASE BE ADVISED THAT CONNECT TEST OF REMOTE MAINTENANCE FUNCTION HAS BEEN EXECUTED BUT FAILED ON THE FOLLOWING EQUIPMENT.  PLEASE TAKE NECESSARY MEASURES TO MEET THE SITUATION WITH REFERENCE TO DIAGNOSIS RESULT.

[SITE INFORMATION]
MODEL NAME [————]  PRODUCTION NUMBER [————]  BLADE NUMBER [XXXX]
UNIQUE NAME [ ]
EVENT DATE [hh HOUR  mm MINUTE  dd DATE  mm MONTH  yyyy YEAR]

[DIAGNOSIS RESULT]
MAIL SETUP [PARTITION AVAILABLE]
RESULT [FAILURE (SMALL=OK, LARGE=NG)]
COUNTER MEASURES [PLEASE SET UP TO MAIL PARTITION AVAILABLE AND EXECUTE CONNECT CONFIRMATION AGAIN]

REMOTE MAINTENANCE SYSTEM, MAIL CONNECT CONFIRMATION METHOD, MAIL CONNECT CONFIRMATION PROGRAM AND MAIL TRANSMISSION ENVIRONMENT DIAGNOSIS PROGRAM

This application claims priority from prior application No. JP 2005-298477, filed Oct. 13, 2005, in Japan.

BACKGROUND OF THE INVENTION

1. Field of the Invention

The present invention relates to a remote maintenance system, a mail connect confirmation method, a mail connect confirmation program, and a mail transmission environment diagnosis program, which report fault information to a maintenance center by an electronic mail through an internet when a fault is detected by a surveillance unit mounted in a user device, and in particular, it relates to a remote maintenance system, a mail connect confirmation method, a mail connect confirmation program, and a mail transmission environment diagnosis program, which transmit a connect confirmation mail and automatically diagnose a mail transmission environment.

2. Description of the Related Arts

Heretofore, there has been known a remote maintenance system, which reports fault information to a maintenance center by an electronic mail through an internet when the fault of a user device is detected. In such a conventional remote maintenance system, a surveillance agent which is a software to keep a hardware fault and the like under surveillance is mounted on the user device, and the surveillance agent, when detecting the hardware fault and the like of the device, reports fault occurrence to the maintenance center in a remote place by the electronic mail (e-mail) through the internet. The maintenance center informs support personnel that a fault occurrence notice has been received, and the support personnel, upon receipt of the report, confirms the report content, and by carrying necessary replacement parts, goes out to repair the user device so as to provide prompt and appropriate maintenance services.

[Patent Document 1] Japanese Patent Application No. 2002-055850

[Patent Document 2] Japanese Patent Application No. 2003-296135

However, in such a conventional remote maintenance system, to provide prompt and appropriate maintenance service, it is important that the electronic mail to report fault occurrence is reliably transmitted. Nevertheless, in recent years, there have emerged many users who are limited in mail transmission environment due to reinforcement and the like of security measures, and there is a problem that the mail transmission has been limited by the subsequent change of the mail transmission environment in spite of the fact that the electronic mail has been normally transmitted in the beginning of starting the system operation. As such a change of the mail transmission environment, for example, the following is cited. Limit a transmitter by source mail address Limit transmission by authentication (such as SMTP-AUTH, POP before SMTP, and the like) at the mail transmitting time Limit by a transmission size Limit (prohibition of partitioned mail transmission and limit of extension code) for reason of virus check and the like. The POP before SMPT records an IP address having passed through the authentication in the POP server, and when receiving a request for mail transmission, checks a recording list of IP addresses, and if there is an IP address having passed the authentication in the list, receives the request for transmission, and if not, refuses the request for transmission. The IP addresses are deleted from the recording list when a definite period of time has passed. Further, the SMTP-AUTH, when receiving a mail, performs authentication of a user account and a password between the SMTP server and the user device, and only when authenticated, permits the mail transmission. In general, while these limits on the mail transmission environment are often performed by the manager of the network, on the other hand, the user receiving a service using the remote maintenance system often does not know the limits on the mail transmission environment, and as a result, there is a problem in that a trouble occurs highly likely in many cases where an electronic mail showing fault occurrence cannot be transmitted at the occurrence time of hardware fault and the like of the user device.

SUMMARY OF THE INVENTION

According to the present invention to provide a remote maintenance system, a mail connect confirmation method, a mail connect confirmation program, and a mail transmission environment diagnosis program, which simply confirm the transmission path of the electronic mail to report fault occurrence and can reliably transmit a mail corresponding to the change of mail transmission environment.

(System)

The present invention aims at a remote maintenance system to report fault information to a maintenance center device by the electronic mail through an internet when detecting a fault by a surveillance unit mounted in the user device.

As such a remote maintenance system, the present invention is characterized in that a connect confirmation unit to prepare and transmit connect confirmation mails of a plurality of patterns different in mail content is provided in the user device, and a diagnosis unit is provided, wherein, from the receiving result of one or a plurality of connect confirmation mails received from the user device within a fixed period of time, the mail transmission environment of the user device is diagnosed, and the diagnosed result is transmitted to the user device or an arbitrary address by the electronic mail.

Here, the connect confirmation unit prepares and transmits connect confirmation mails of a plurality of patterns different in either of the presence or absence of a partitioned mail, a mail size, an attachment file size, the number of attachment files, an extension code of the attachment file name or a length of the attachment file name.

The diagnosis unit, in case the connect confirmation mails of all patterns are possible to receive from among the connect confirmation mails of a plurality of patterns transmitted from the user device, transmits a connect success as a diagnosis result, and in case there is any connect confirmation mail not possible to receive, transmits a message urging a setup change of the mail transmission environment as a diagnosis result.

The connect confirmation unit, in case the presence of a mail partition is set in the mail transmission environment, prepares and transmits a first connect confirmation mail attached with no file having a size of less than a predetermined partition size and a second connect confirmation mail attached with a file having a size more than the partition size, wherein the diagnosis unit transmits a connect success as a diagnosis result in case both of the first connect confirmation mail and the third connect confirmation mail are possible to receive, and wherein the diagnosis unit transmits a setup change to no partitioned mail as a diagnosis result in case the first connect confirmation mail is possible to receive and the second connect confirmation mail is not possible to receive.

The connect confirmation unit, in case no partitioned mail is set in the mail transmission environment, prepares and transmits the first connect confirmation mail attached with no file having a size of less than a predetermined partition size and a third connect confirmation mail attached with a file having a sufficient size for the partition size, wherein the diagnosis unit transmits a connect success as a diagnosis result in case both of the first connect confirmation mail and the third connect confirmation mail are possible to received, and wherein the diagnosis unit transmits a setup change to the presence of the partitioned mail as a diagnosis result in case the first connect confirmation mail is possible to receive and the third connect confirmation mail is not possible to receive.

As a mail size, for example, the first connect confirmation mail is taken as less than 64 KB, and the second connect confirmation mail is taken as 64 to 128 KB, and the third connect confirmation mail is taken 2 megabytes.

The connect confirmation unit, in case the diagnosis result is not possible to receive from the maintenance system even after a fixed period of time having passed after transmitting the connect confirmation mail, outputs a message to the effect that the mail transmission environment be reviewed.

The connect confirmation unit, prior to starting the system operation, transmits a connect confirmation mail. Further, the connect confirmation unit may transmit the connect confirmation mail in association with a periodic report mail periodically transmitted. Further, the connect confirmation unit transmits a connect confirmation mail in association with a fault occurrence mail transmitted by the fault detection of the user device.

(Method)

The present invention, when the fault is detected by the surveillance unit mounted with the user device, provides a mail connect confirmation method of the remote maintenance system to report the fault information to the maintenance center by the electronic mail through the internet.

The mail connect confirmation method of the present invention comprises:

a connect confirmation step of preparing and transmitting connection firming mails of a plurality of patterns different in mail content from the user device; and a diagnosing step of diagnosing the mail transmission environment of the user device from the receiving result of one or a plurality of connect confirmation mails received from the user device within a fixed period of time at the maintenance center and transmitting the diagnosis result to the user device or an arbitrary address by the electronic mail.

(Program)

The present invention provides a mail confirmation program to be executed by a computer of the user device to report the fault information to the maintenance center by the electronic mail through the internet when the fault is detected. That is, the present invention is characterized in that the mail connect confirmation program of the present invention allows the computer of the user device to execute:

a connect confirmation step of preparing and transmitting the connect confirmation mails of a plurality of patterns different in mail content from the user to the maintenance center; and a diagnosis result reception step of receiving and displaying the diagnosis result of the mail transmission environment of the user device based on the reception result of the connect confirmation mail transmitted from the maintenance center.

The present invention, when a fault is detected by the surveillance unit mounted in the user device, provides a mail transmission environment diagnosis program to be executed by the computer of the maintenance center to receive the electronic mail on the fault information transmitted through the internet. That is, the present invention is characterized in that the mail transmission environment diagnosis program of the present invention allows the computer of the maintenance center to execute:

a connect confirmation mail reception step of receiving the connect confirmation mails of a plurality of patterns different in mail content transmitted from the user device; and a diagnosing step of diagnosing the mail transmission environment of the user device from the receiving result of one or a plurality of connect confirmation mails received from the user device within a fixed period of time at the maintenance center, and transmitting the diagnosis result to the user device or an arbitrary address by the electronic mail.

According to the present invention, at the operation starting time of the maintenance services or in the appropriate timing during the operation and the like, the connect confirmation mails of a plurality of patterns different in mail content are transmitted from the user device to the maintenance center, and from the reception status of the connect confirmation mails in the maintenance center, the mail transmission environment at the user side is diagnosed, and in case there are connect confirmation mails of the patterns not possible to receive, a message urging the setup change of the mail transmission environment of the user so as to be able to receive the mails is transmitted by the mail as a diagnosis result, and by performing the setup change based on the diagnosis result at the user side, a mail communication route between the user device and the maintenance center is secured, and in case a fault occurs in the user device, the fault occurrence is reliably transmitted to the maintenance center by the electronic mail, thereby making it possible to provide prompt and appropriate maintenance services. The above and other objects, features, and advantages of the present invention will become more apparent from the following detailed description with reference to the drawings.

BRIEF DESCRIPTION OF THE DRAWINGS

FIG. 1 is a block diagram of a remote maintenance system applied to the present invention;

FIG. 3 is an explanatory drawing of the software configurations of the user device and the center device of FIGS. 2A and 2B;

FIG. 7 is an explanatory drawing showing the type of a connect confirmation mail used in the present invention;

FIG. 8 is an explanatory drawing of the connect confirmation mail combination pattern transmitted by combing the connection confirmation mail of FIG. 7;

FIG. 10 is an explanatory drawing of a criterion for the mail reception of a partition confirmation pattern by the maintenance center device of FIG. 1;

FIG. 11 is an explanatory drawing of a criterion for the mail reception of a size limit confirmation pattern by the maintenance center of FIG. 1;

FIG. 12 is an explanatory drawing of a diagnosis result screen at a connect confirmation success time by the partition confirmation pattern;

FIG. 13 is an explanatory drawing of a diagnosis result screen at a connect confirmation success time by the partition confirmation pattern;

FIG. 14 is an explanatory drawing of a diagnosis result screen at a connect confirmation success time by the size limit confirmation pattern; and FIG. 15 is an explanatory drawing of a diagnosis result screen at a connect confirmation success time by the size limit confirmation pattern.

DETAILED DESCRIPTION OF THE PREFERRED EMBODIMENTS

FIG. 1 is a block diagram of a remote maintenance system applied to the present invention. In FIG. 1, a maintenance center device 10 installed in a maintenance center providing maintenance services is connected with user devices 12-1 to 12-4 installed in the user which provide maintenance services through an internet 14. The user devices 12-1 to 12-4 are information processing equipment or systems such as a computer and the like, and are mounted with surveillance agents 16-1 to 16-4 as software. The surveillance agents 16-1 to 16-4 keep a fault such as hardware fault and the like under surveillance in the user devices 12-1 to 12-4, and when detecting the fault, report to the maintenance center device 10 by the electronic mail through the internet 14. The maintenance center device 10 having received a fault report by the electronic mail from the surveillance agents 16-1 to 16-4 analyzes the mail content, and makes a display-output so as to inform support personnel to the effect that a fault occurrence report has been received. Upon receipt of this fault report, the support personnel confirms the report content, and by carrying necessary replacement parts and the like, goes out to repair the user devices 12-1 to 12-4.

Figure 2A:
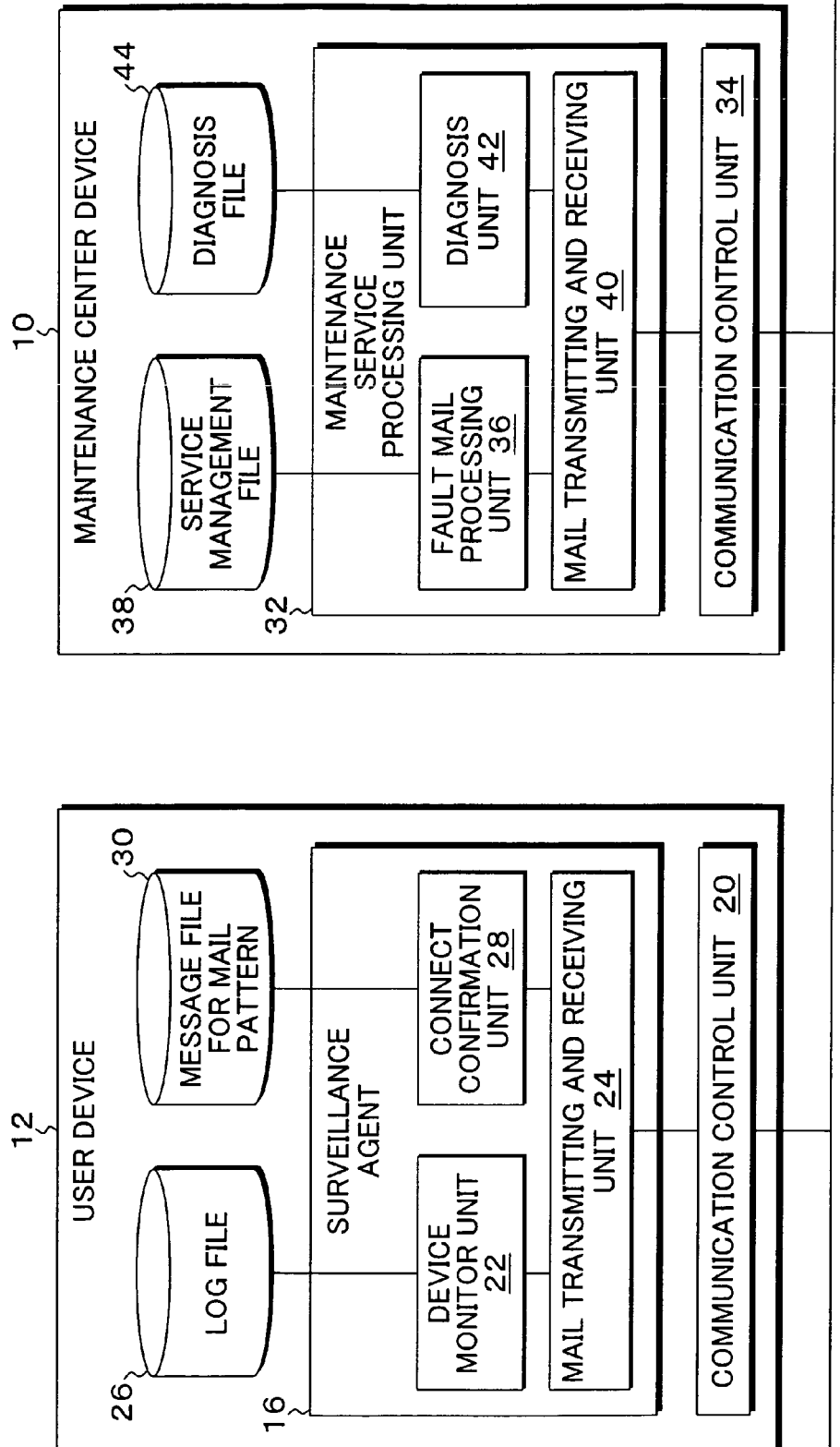
FIGS. 2A and 2B are block diagrams of the functional configurations of a user device and a center device comprising a confirmation function of a mail transmission route according to the present invention.
Figure 2B:
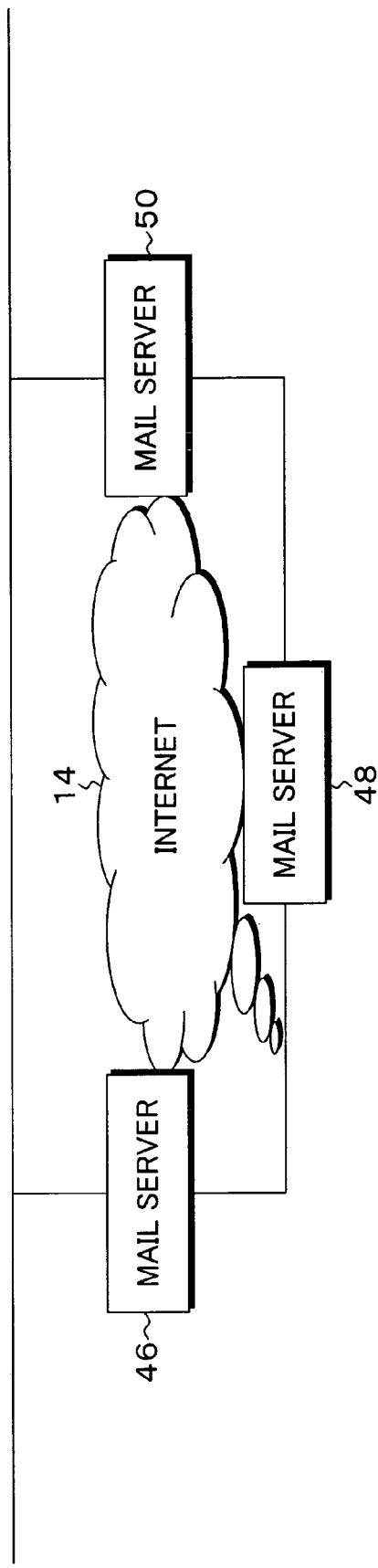

FIGS. 2A and 2B are explanatory drawings of the functional configurations of a user device and a center device comprising the confirmation function of a mail transfer route by the present invention. In FIGS. 2A and 2B, the user device 12 represents the user devices 12-1 to 12-4 of FIG. 1, and the user device 12 is provided with a surveillance agent 16 and a communication control unit 20. The surveillance unit 16 functions by being mounted in the application executing environment of the computer which configures the user device 12. The surveillance agent 16 is provided with a device surveillance unit 22, a mail transmitting and receiving unit 24, and further, a connect confirmation unit 28 to realize a mail transfer route confirmation function by the present invention. The device surveillance unit 22 is provided with a log file 26, and the connect confirmation unit 28 is provided with a mail pattern message file 30. On the other hand, the maintenance center device 10 is provided with a maintenance service processing unit 32 and a communication control unit 34. The maintenance service processing unit 32 functions by being mounted in the application executing environment by the computer which configures the maintenance center device 10. The maintenance service processing unit 32 is provided with a fault mail processing unit 36, a mail transmitting and receiving unit 40, and further a diagnosis unit 42 to confirm the mail transfer route by the present invention. The fault mail processing unit 36 is provided with a service management file 38, and further, the diagnosis unit 42 is provided with a diagnosis file 44. A mail transfer route passing through mail servers 46, 48, and 50 on the internet 14 is formed as one example between the user device 12 and the maintenance center device 10. A function corresponding to the remote maintenance system in the surveillance agent 16 of the user device 12 and the maintenance service processing unit 32 of the maintenance center device 10 is configured by the device surveillance unit 22 of the surveillance agent 16 and the log file 26, and the maintenance service processing unit 32 is configured by the fault mail processing unit 36 and the service management file 38. These are functions primarily provided for the conventional remote system, and the device surveillance unit 22 of the surveillance agent 16 keeps the fault such as hardware fault of the user device 12 under surveillance, and when the fault is detected, the fact that the fault has occurred is reported to the maintenance device 10 by the mail transmitting and receiving unit 24 by the electronic mail. Further, the device surveillance unit 22 collects the logs of the user device 12, and stores the collected logs into a log file 26. The logs collected accompanied with a fault, after the initial fault report mail is transmitted, are transmitted to the maintenance center device 10 by attaching a log file to another electronic mail as occasion demands. Further, the device surveillance unit 22 transmits a periodic mail accompanied with setup of the mail transfer route once a day or once a week to confirm the mail transfer route with the maintenance center device 10. The fault mail processing unit 36 of the maintenance service processing unit 32 in the maintenance center device 10, when receiving the report of fault occurrence by the electronic mail from the surveillance agent 16 of the user device 12, displays "fault occurrence" on the device display so as to inform the support personnel, thereby instructing counter-measures. Further, the fault mail processing unit 36 manages reception of a periodic mail transmitted from the surveillance agent 16, and in case the periodic mail once a day or once a week is prevented from being received, determines that a fault has occurred in the mail transfer route, and issues a fault occurrence report of the mail transfer route to the support personnel. In addition to such a remote maintenance function, the present invention performs a mail transfer route confirmation processing by using a connect confirmation mail in a predetermined timing, and therefore, the surveillance agent 16 is provided with the connect confirmation unit 28 and the mail pattern message file 30, and further, the maintenance center device 10 side is provided with a diagnosis unit 42 and a diagnosis file 44.

The timing of the mail transfer route confirmation processing by the present invention, for example, becomes as follows.

1. System operation starting time
2. Fault detection time by the surveillance agent 16
3. Periodic mail reporting time The connect confirmation unit 28 provided in the surveillance agent 16, when receiving a connect confirmation transmission request, prepares a connect confirmation mails of a plurality of patterns difference in mail content, and transmits them to the maintenance center device 10 through the mail servers 46, 48, and 50 via the communication control unit 20 from the mail transmitting and receiving unit 24. The diagnosis unit 42 provided in the maintenance center device 10 diagnoses the mail transmission environment of the user device 12 from the receiving result of one or a plurality of connect confirmation mails received within a fixed period of time, and transmits the diagnosis result to the user device 12 by the electronic mail. Here, as the connect confirmation mails of a plurality of patterns transmitted from the connect confirmation unit 28, the connect confirmation mails of a plurality of patterns different in the presence or absence of partitioned mails, a mail size, an attachment file, an extension code of the attachment file name, a length of the attachment file name or the like are prepared and transmitted.

In the specific embodiment of the present invention, a case where the presence or absence of the designation of the mail partition is performed as the transmission environment of the user device 12 is taken as an example, and the following three types of the connect confirmation mails are prepared and transmitted.

1. A first connect confirmation mail (small mail) attached with no file having a size less than the partition size
2. A second connect confirmation mail (partial mail) attached with a file having a size more than the partition size
3. A third connect confirming mail (large mail) attached with a file having a sufficiently large size for the partition size Further, to transmit these three types of connect confirmation mails all at once by one time connect confirmation, it is necessary to extremely shorten the processing time of the confirmation of the mail transfer route at a time when taking into a consideration that a great many number of user terminal devices such as several hundreds to several thousands are actually connected to the maintenance center device 10, and therefore, with respect to three types of connect confirmation mails, the current mail transmission environment of the user device 12 is divided into the presence or absence of the mail partition setup, and by utilizing the combination of the two mail patterns, the connect confirmation of the mail transfer route is performed.

This combination is divided into
1. a partition confirmation pattern, and
2. a size control confirmation pattern.

The case of the partition confirmation pattern is a case where the partition setup exists as the mail transmission environment, and in this case, the first connect confirmation mail (small mail) and the second connect confirmation mail (partial mail) are transmitted. Further, a size limit confirmation pattern is a case where the partition setup does not exist as the mail transmission environment, and in this case, the first connect confirmation mail (small mail) and the third connect confirmation mail (large mail) are transmitted. Further, in case the connect confirmation unit 28 of the surveillance agent 16 prepares and transmits the connect confirmation mails of a plurality of patterns, there is a possibility that a fault occurs also where the connect confirmation mails are not transmittable at all at the maintenance center device 10 side, and therefore, in this case, the diagnosis result by the electronic mail from the diagnosis unit 42 of the maintenance center device 10 is not possible to receive, and hence, the connect confirmation unit 28 sets up and keeps a time-out time under surveillance until receiving the diagnosis result from transmitting the connect confirmation mail, and in case the time-out is taken while waiting for the reception of the diagnosis result, the abnormality of the mail transmission receiving environment is output-displayed to the user.

FIG. 3 is an explanatory drawing of the software configurations of the user device and maintenance center device of FIGS. 2A and 2B. In FIG. 3, the surveillance agent 16 of the user device 12 is executed on an OS 52 of the computer, which configures the user device 12, and installs a screen processing unit 54 providing the mail transmitting and receiving unit 24, a device monitor unit 22, and the connect confirmation unit 28, and further, a graphic user interface screen of the device monitor unit 22 and the connect confirmation unit 28 on the OS 52 as applications. On the other hand, the maintenance service processing unit 32 of the maintenance center device 10 also installs the screen processing unit 58 displaying a graphic user interface screen for the support personnel in addition to the mail transmitting and receiving unit 40, the fault mail processing unit 36, and the diagnosis unit 42 as applications on an OS 56 of the computer, which configures the maintenance center device 10. As the OSs 52 and 56, an appropriate OS such as a Solaris (R), Linux and the like is used.

Figure 4:
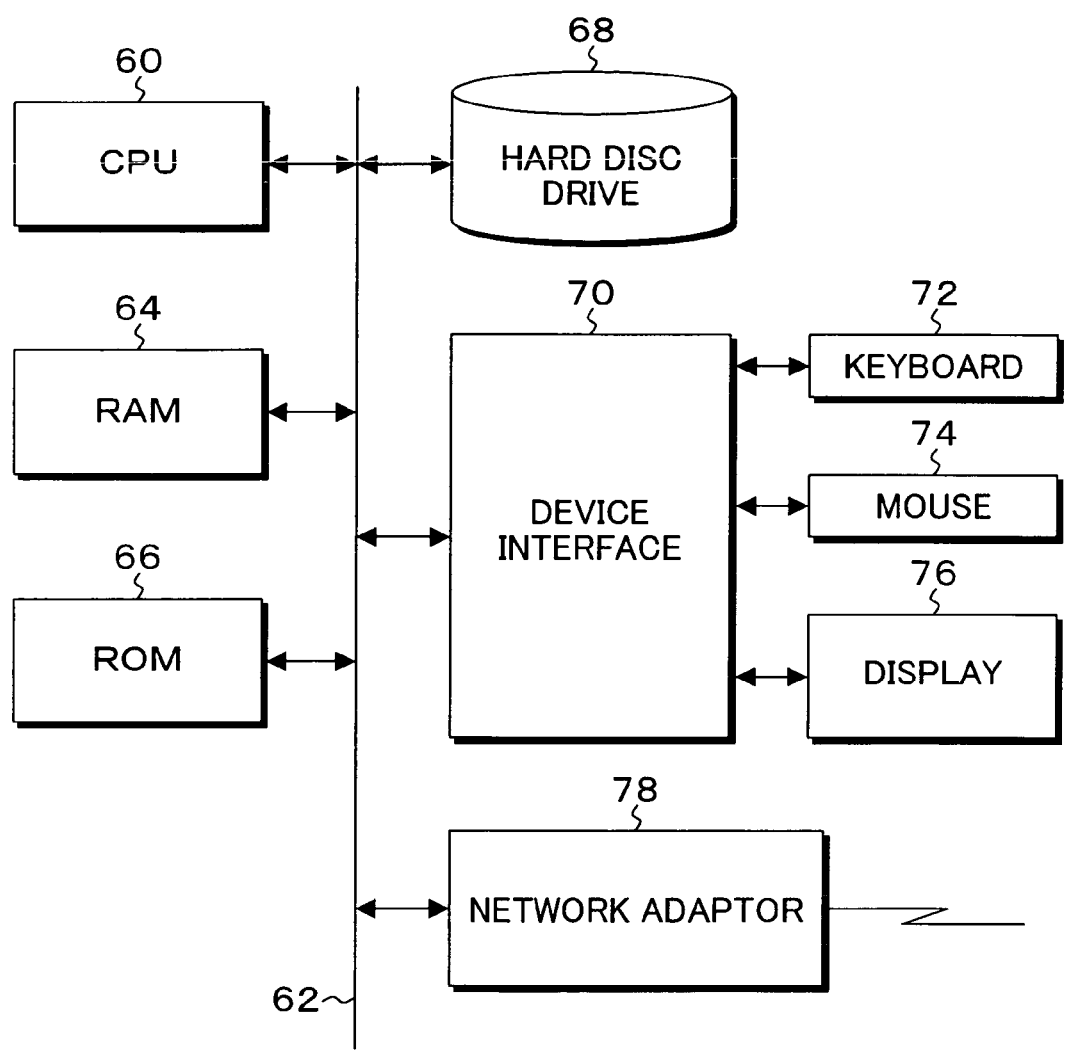
FIG. 4 is a block diagram of the hardware environment of a computer to realize the user device and a maintenance center device of FIG. 1.

FIG. 4 is a block diagram of the hardware environment of a computer to realize the user device 12 and the maintenance center device 10. In FIG. 4, a BUS 62 of a CPU 60 is provided with a RAM 64, a ROM 66, a hard disc drive 68, a keyboard 72, a mouse 74 and a device interface 70 to connect a display 76, and a network adaptor 78 to perform the communication connection with the internet. The hard disc drive 68 is stored with the programs of the main transmitting and receiving unit 24, the device monitor unit 22, the connect confirmation unit 28 and the screen processing unit 54 as applications, in addition to the OS 52 shown in FIG. 4, which are read by the RAM 64 and executed by the CPU 60 when the computer is activated.

For the maintenance center device 10 of FIGS. 2A and 2B, the same hardware environment of the computer as FIG. 4 is used, and the hard disc drive 68 is installed with the programs of the mail transmitting and receiving unit 40, the fault mail processing unit 36, the diagnosis unit 42, and further, the screen processing unit 58 as applications in addition to the OS 56 shown in the maintenance center device 10 of FIG. 3, and is read by the RAM 64 when the computer is activated, and is executed by the CPU 60.

Figure 5:
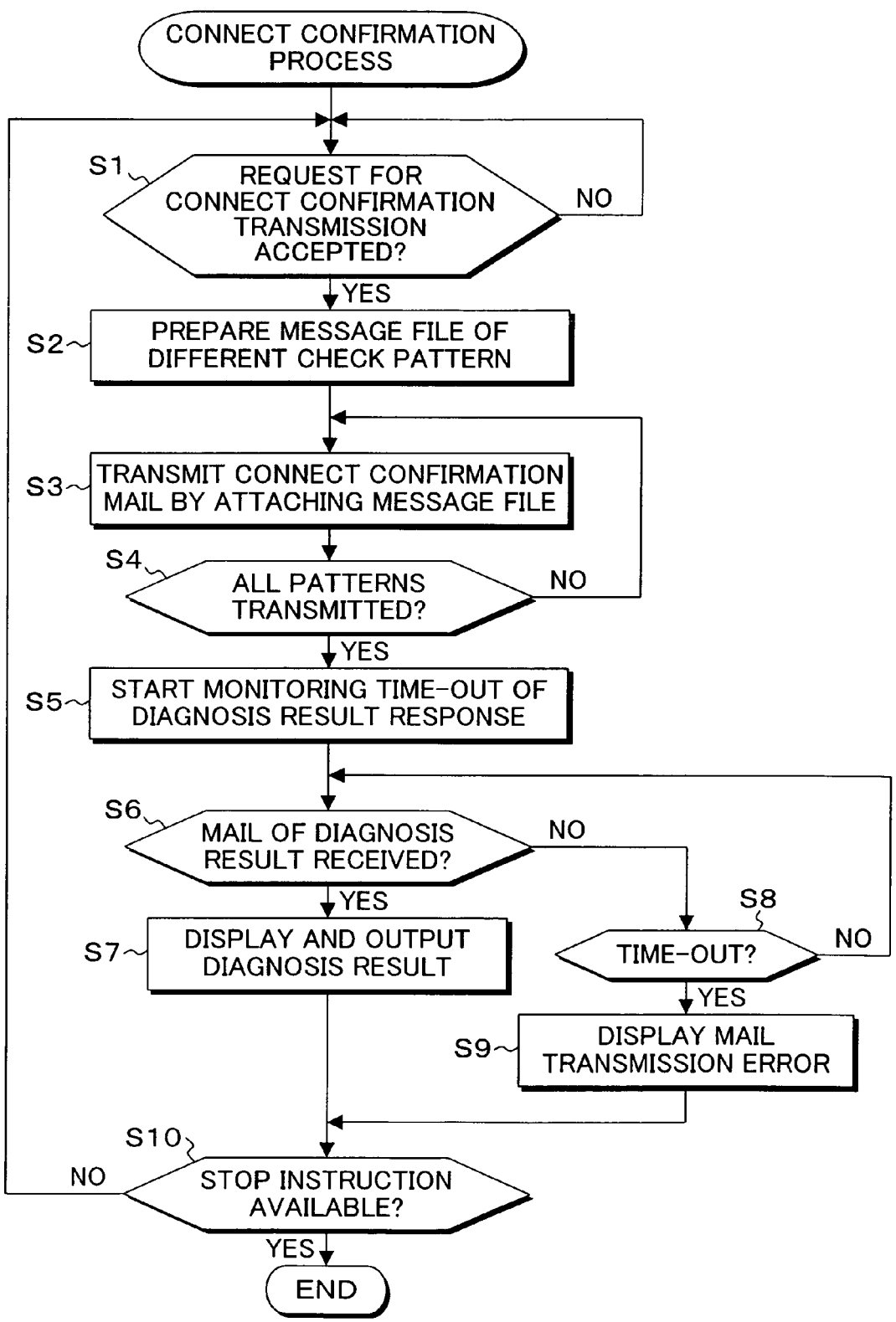
FIG. 5 is a flowchart of the connect confirmation processing by a surveillance agent of FIG. 1.

FIG. 5 is a flowchart of the connect confirmation processing by the connect confirmation unit 28 provided in the surveillance agent 16 of FIG. 1. In FIG. 5, the connect confirmation unit checks the presence or absence of the reception of the connect confirmation transmission request at step S1, and the connect confirmation transmission request is submitted and accepted at the rising time prior to the start of the system operation, at the report time of a fault mail by detecting the fault of the user device 12 by the surveillance agent 16 or at the periodic mail report time once a day and once a week or the like. At step 1, when the acceptance of the connect confirmation transmission request is determined, at step S2, the message files of a plurality of different patterns are prepared. These message files are stored in advance in the mail pattern message file 30 of FIGS. 2A and 2B. Subsequently, at step S3, the connect confirmation mail attached with the initial message file is transmitted. Subsequently, at step S4, the connect confirmation unit checks the presence or absence of the transmission of all patterns, and if not yet transmitted, the connect confirmation unit returns to step S3, and transmits the connect confirmation mail attached with the next message file. Among the connect confirmation mails, there are also included the mail texts only with no message file attached. At step 4, when the transmission of all patterns of the connect confirmation mails is determined, the connect confirmation unit advances to step S5, and starts a diagnosis result response time-out surveillance for the mail reception of the diagnosis result from the maintenance center device 10, and at step S6, the connect confirmation unit checks the presence or absence of the reception of a diagnosis result mail. In case the mail of the diagnosis result is not received, at step S8, the connect confirmation unit checks the presence or absence of the time-out, and when the mail of the diagnosis result is received at step S6 before the time-out is taken, the connect confirmation unit advances to step S7, and display-outs the received diagnosis result. On the other hand, before receiving the mail of the diagnosis result at step S6, in case the time-out is taken at step 8, the connect confirmation unit advances to step S9, and in this case, determining that the connect confirmation mails of a plurality of patterns are not all sent to the maintenance center device 10 side, displays a mail transmission error, and output-displays a review of the mail transmission environment to the user. Such processings of steps S1 to S9 are repeated at step S10 until a stop instruction is issued by the user device.

Figure 6:
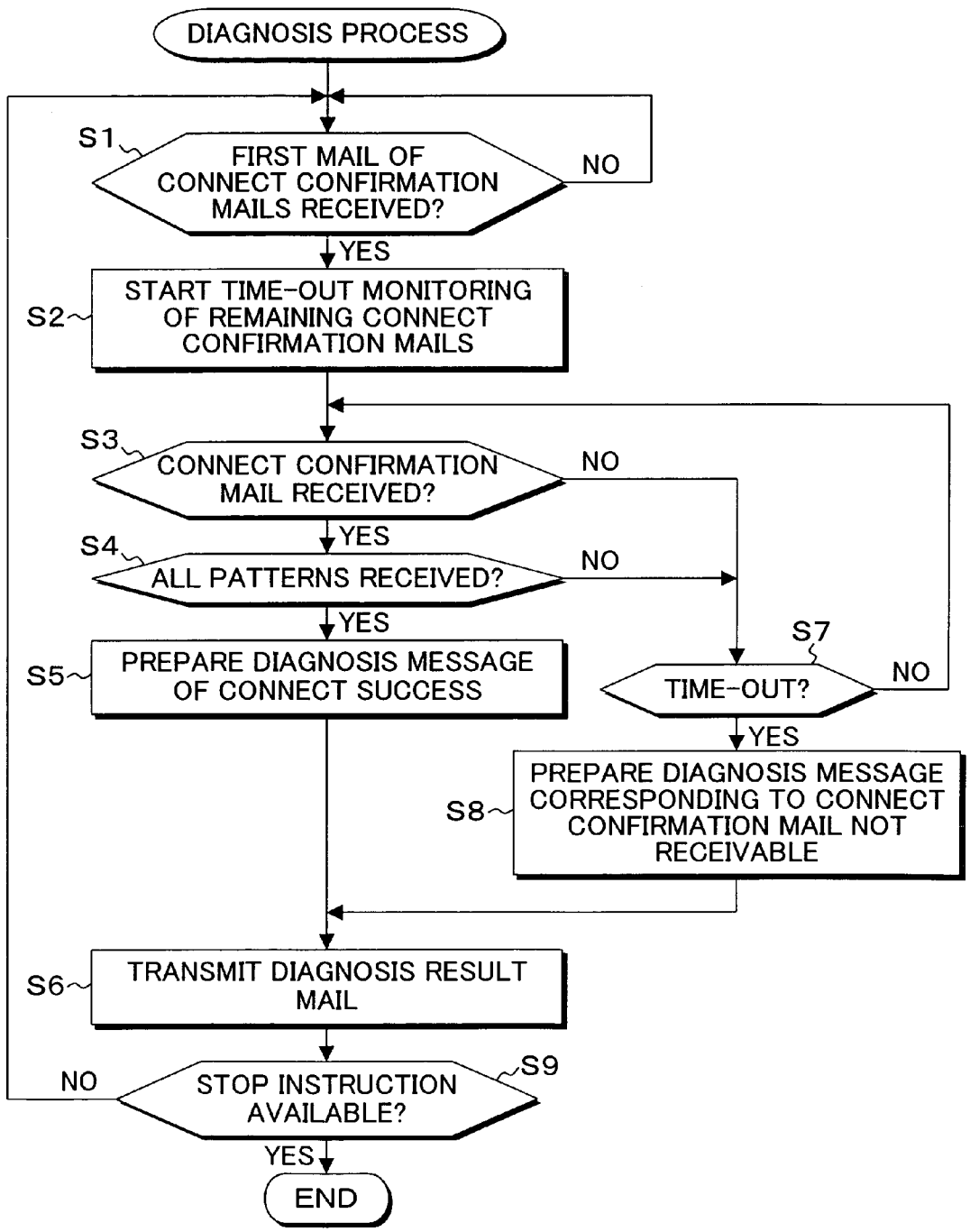
FIG. 6 is a flowchart of a diagnosis processing by the maintenance center device of FIG. 1.

FIG. 6 is a flowchart of the diagnosis processing by the diagnosis unit 42 provided in the maintenance service processing unit 32 of the maintenance center device 10 of FIG. 1. In FIG. 6, in the diagnosis processing for the connect confirmation mails of a plurality of patterns transmitted from the user device 12, the diagnosis unit 42 checks a reception of the first mail of the connect confirmation mails at step S1, and upon receipt of the first mail, at step S6, starts the time-out surveillance of the remaining connect confirmation mails. Next, at step S3, the diagnosis unit 42 checks whether or not the connect confirmation mails are received, and if received, at step S4, the diagnosis unit 42 checks whether or not all patterns are received. In case all patterns are received, at step S5, the diagnosis unit 42 prepares the diagnosis message of a connect success, and at step S6, transmits a diagnosis result mail to the user device 12. On the other hand, in case the connect confirmation mail is not received at step S3 or even if the connect confirmation mail is received at step S4, in case all patterns are not received, the presence or absence of the time-out is checked at step S7, and in case all patterns are not received and the time-out is determined at step S7, the diagnosis unit 42 advances to step S8, and prepares a diagnosis message corresponding to the connect confirmation mail of "reception not possible", and transmits the diagnosis result to the user device 12 at step S6. Such processings of steps S1 to S6 are repeated until a stop instruction is issued by the maintenance center device 10 at step S9.

FIG. 7 is an explanatory drawing showing one example of a connect confirmation mail type 80 to be used in the present invention. In FIG. 7, as connect confirmation mail patterns, in the present embodiment, as shown in a check pattern 82, three types such as the first connect confirmation mail, the second connect confirmation mail, and the third connect confirmation mail are prepared. Each check pattern 82 comprises attributes of a connect confirmation content 84, a transmission size 86, a code 88 and a file attachment 90. The first connect confirmation mail is a mail not partitioned, and for example, is a mail less than 64 kb set as a partition size, and is a mail text only with no attachment file. The second connect confirmation mail is a mail having a size to be partitioned, and for example, has a size of more than 64 kb in case the setup of the partition size is 64 kb, for example, approximately 64 to 128 kb, and is provided with an attachment file so as to realize the mail size. A file to be attached in order to secure a transmission size for the second connect confirmation mail is prepared in advance as a dummy file, and further, since a mail transmission between the user device 12 and the maintenance center device 10 in the remote maintenance system shown in FIGS. 2A and 2B performs a code compression on the attachment file, the connect confirmation mail also is attached with a compressed dummy file used as an attachment file. Further, the third connection confirmation mail is a mail to transmit a size to be portioned without partition, and is, for example, 2 Mb as a transmission size, and is attached with a dummy size to realize this transmission size, and the attached dummy file, similarly to the second connect confirmation mail, is given a code compression. Here, though it is desirable that the third connect confirmation mail is changed to the maximum size of the electronic mail transmittable by the remote maintenance system of FIG. 3, usually, since the maximum size becomes large such as several megabytes, if such large size is used for connect confirmation, occupancy of the mail transfer route for connect confirmation with a number of user devices takes too much time, and therefore, for example, the transmission size is taken as 2 Mb, which is approximately one third of the maximum size.

FIG. 8 is an explanatory drawing of the combined patterns of the connect confirmation mails to be transmitted by combining the connect confirmation mails of FIG. 7. A connect confirmation mail combined pattern 92, since the setup 96 of the mail transmission environment of the user device 12 can be set to either of the presence of partition or the absence of partition, prepares a partition confirmation pattern corresponding to "the presence of the partition", and prepares a size limit confirmation pattern corresponding to "the absence of the partition" With respect to the partition confirmation pattern in the case of the presence of the partition, the first connect confirmation mail and the second connect confirmation mail, and the first connect confirmation mail and the third connect confirmation mail are transmitted in order as the connect confirmation mail type and sequence. Thus, with respect to the three mail patterns shown in FIG. 7, corresponding to the presence or absence of the partition in the mail transmission environment, by combining and transmitting the two patterns thereof, comparing to the case of transmitting the three patterns, only two patterns can manage, and therefore, the communication time for the connect confirmation of the mail transfer route can be sharply reduced. That is, to confirm the connection of the mail transfer route between the user device 12 and the maintenance center 10, though it is desirable to perform a check by connection confirmation mail of all patterns (three patterns) shown in FIG. 7, if all patterns are transmitted every time, the connect confirmation takes a time, and therefore, according to the mail transmission environment in the user device 12 at that time, to be specific, the presence or the absence of the partition setup, as shown in FIG. 8, the connect confirmation mail by the combination of the two patterns is transmitted, thereby performing the connect confirmation. Here, as used hours required for the connect confirmation of the mail transfer route, when it is considered that the mail transfer of 2.1 mega byte is, for example, performed on the line of approximately 50 K pps of the executable speed on the condition of the size limit confirmation pattern of FIG. 8, the mail transfer time is six minutes, and when considering this time together with the time of reception at the center, a mail chain, and the like, approximately eight to ten minutes of the processing time is required. On the other hand, in the case of the partition confirmation pattern of FIG. 8, for example, the mail transmission of 0.2 Mb is performed, and in this case, approximately one minute of the used hour suffices. Hence, for the time-out time of the diagnosis result response at step S5 of FIG. 5 and the time-out surveillance of the remaining connect confirmation mail at step S2 of FIG. 6, the time-out time corresponding to the processing time required for the combined transmission patterns of FIG. 8 is set, respectively. Naturally, the time-out time corresponding to the processing time at the size limit confirmation pattern side which is large in transmission size may be fixedly set.

Figure 9:
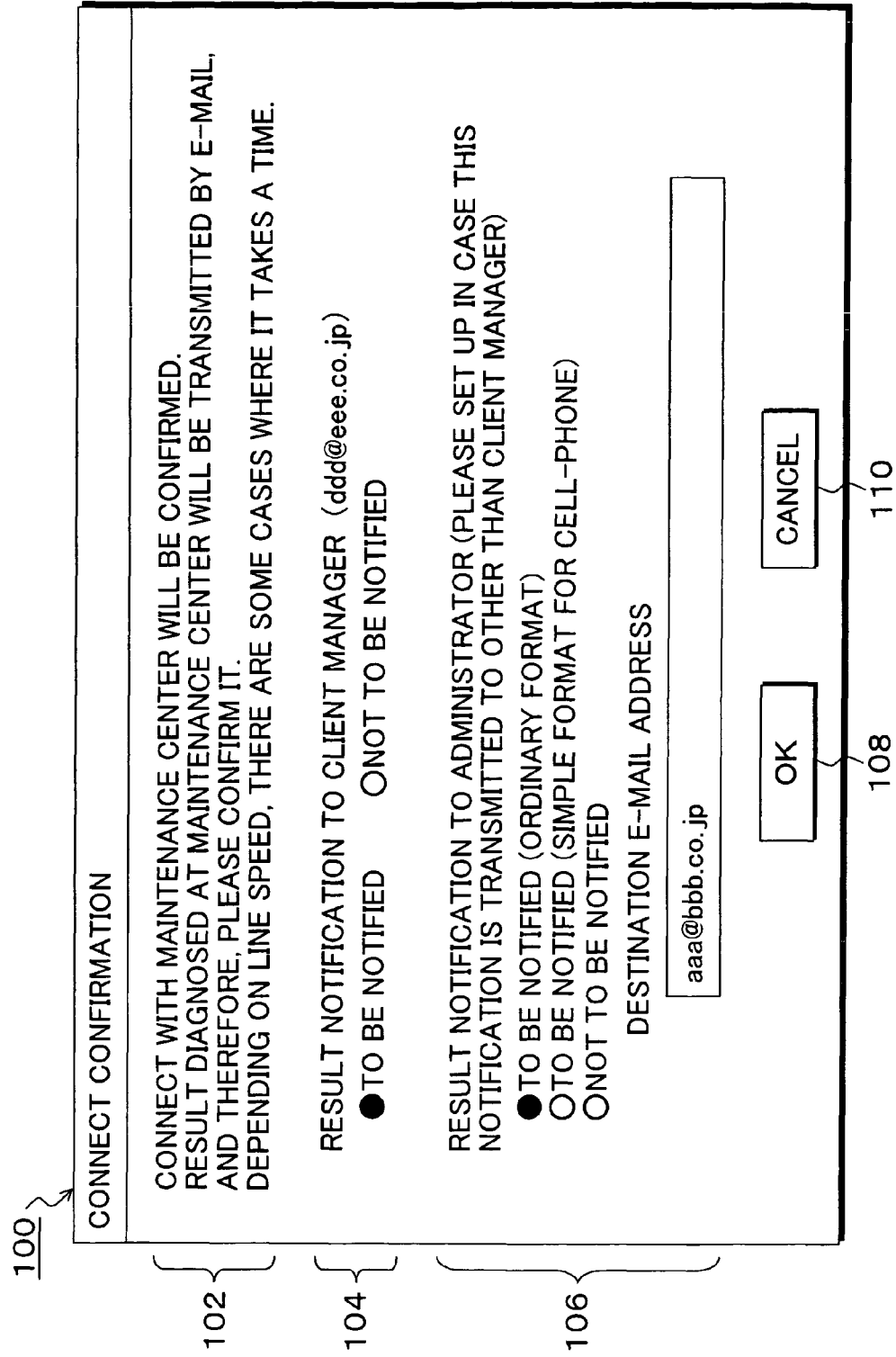
FIG. 9 is an explanatory drawing of a connect confirmation execution screen displayed in the surveillance agent of FIG. 1.

FIG. 9 is an explanatory drawing of the connect confirmation execution screen displayed by the user device 12 of FIG. 1. In the connect confirmation execution screen 100 of FIG. 9, subsequent to the connect confirmation message 102, a selection of the presence or absence of a result report 104 to a client manager is displayed, and further, a result report 106 to an effector is displayed. For the result report 104 to the client manager and the result report 106 to the effector, after having set up either of reporting or not reporting, when an OK button 108 is depressed, at step S1 of FIG. 5, the connection confirmation transmission request is accepted, and a series of connect confirmation processings from step S2 are executed. Naturally, for the connect confirmation in association with the fault detection or the connect confirmation in association with periodic mails, the connect confirmation transmission request is automatically generated in association with these pieces of the confirmation, respectively, and the connect confirmation processing is executed.

FIG. 10 is an explanatory drawing of the criterion of the connect confirmation for the mail reception of the partition confirmation pattern of FIG. 8, which is used by the diagnosis unit 42 provided in the maintenance center device 10 of FIG. 1, and this partition confirmation pattern criterion 112 is registered in advance in the diagnosis file 44. In the partition confirmation pattern criterion 112 of FIG. 10, since the first connect confirmation mail and the second connect confirmation mail are transmitted in order by the user device 12, a case 1 shows that both mails are received, and a case 2 shows that the first connect confirmation mail is received and the second connect confirmation mail is not received, and a case 3 shows that the first connect confirmation mail is not received and the second connect confirmation mail is received. With respect to the case 1, since there is no problem in the transmission mail environment, no counter-measure for the user device is required. With respect to the case 2, the second connect confirmation mail, which is transmitted as a mail size to be partitioned, is not received, and the mail transmission environment of the user device becomes [set to the presence of the partitioned mail limit]. Hence, since the mail is not possible to receive, the [set to no portioned mail] is required as a counter-measure. With respect to the case 3, the first connect confirmation mail, which is small in transmission size, is not received, and the second connect confirmation mail, which is large in transmission size and is portioned, is received, and this is usually not possible, and therefore, the [check of an error mail] or the [review of the mail transmission environment] is required as a counter-measure.

FIG. 11 is a size limit confirmation pattern criterion 114 when the connect confirmation mail by the size limit confirmation pattern of FIG. 8 is received, and this criterion is also similarly registered in advance in the diagnosis file 44 provided in the maintenance center device 10 of FIGS. 2A and 2B. The size limit confirmation pattern criterion 114 shows the first connection confirmation mail which is the smallest in transmission size and the third connect confirmation mail which transmits a portioned size without partition is received. In this case, a case 4 shows that both mails are received, and a case 5 shows that the first connect confirmation mail is received, and the third connect confirmation mail is not possible to receive. On the contrary, a case 6 shows that the first connect confirmation mail is not possible to receive, and the third connect confirmation mail is received. In the case 4 where both mails is received, there is no problem in the mail transmission environment, and no counter-measure is required. In the case 5 where the first connect confirmation mail is received, and the third connect confirmation mail is not possible to receive, since there is a transmission size limit in the transmission mail environment, the presence of the partitioned mail is required to be set up as a counter-measure. The case 6 is a case where the first connect confirmation mail which is small in transmission size is not possible to receive, and the third connect confirmation mail which is large in size is received. Such a case is usually not possible, and in this case, a counter-measure such as a check of the error mail and a review of the transmission environment is required.

FIG. 12 is an explanatory drawing of a diagnosis result screen 116-1 of the connect confirmation success time (test success time) by the partition confirmation pattern equivalent to the case 1 of FIG. 10. In the diagnosis result screen 116-1 showing the test success time, subsequent to a remote connect completion report slip 118-1, site information 120-1 is provided, below which is displayed a diagnosis result 122-1 by the following contents:
1. current status
2. diagnosis result information At the test success time, as the current status, [mail setup {the presence of partition setup}] is displayed, and further, as the content of the diagnosis result, [success (SMALL=OK, PATIAL=OK)] is displayed.

FIG. 13 is an explanatory drawing of the result screen at the connect confirmation failure time by the partition confirmation pattern equivalent to the case 2 of FIG. 10. A diagnosis result screen 116-2 at the test failure time is provided with site information 120-2 subsequent to a remote connect result report slip 118-2, and a diagnosis result 122-2 below thereof is displayed with [mail setup {the presence of partition}] as the current status, and is displayed with [failure (SMALL=OK, PARTIAL=NG)] as a diagnosis result, and further, is displayed with [please set to no partitioned mail, and execute the connect confirmation again] as a counter-measure.

FIG. 14 is an explanatory drawing of the result screen of the connect confirmation success time (test success time) by the size limit confirmation pattern equivalent to the case 4 of FIG. 11. A diagnosis result screen 124-1 at the test success time is provided with site information 128-1 subsequent to a remote connect completion report slip 126-1, and subsequently, is provided with a diagnosis result 130-1. The diagnosis result 130-1 is [mail setup {the presence of partition}] as the current status, and subsequently, as the diagnosis result, [success (SMALL=OK, LARGE=OK)] is displayed.

FIG. 15 is an explanatory drawing of the result screen at the connect confirmation failure time by the size limit confirmation pattern equivalent to the case 5 of FIG. 11. A diagnosis result screen 124-2 at the test failure time is displayed with site information 128-2 subsequent to the remote connect result completion report slip 126-1, and subsequently, is displayed with a diagnosis result 130-2. The diagnosis result 130-2 displays [mail setup {the presence of partition}] as the current status, and displays [failure (SMALL=OK, LARGE=NG)] as a diagnosis result, and further, displays [please set to the presence of mail partition, and execute the connect confirmation again] as a counter measure. Further, the present invention provides a mail connect confirmation program to function as the connect confirmation unit 28 by the surveillance agent 16 provided in the user device 12 of FIG. 1, and this mail connect confirmation program has the content shown in the flowchart of FIG. 5. Further, the present invention provides a diagnosis program to function as the diagnosis unit 42 of the maintenance service processing unit 32 provided in the maintenance center device 10 of FIG. 9, and this diagnosis program has the content shown in the flowchart of FIG. 7. Although the above described embodiment takes as an example the case where the presence or absence of the partition setup is performed as the mail transmission environment, as a limit of the mail transmission environment assumed other than this, there are a transmitter limit of the transmission origin mail address mainly performed as security counter-measures, an authentication at the mail transmitting time, and the like, and even when such a limit of the mail transmission environment is performed in a network environment side, similarly, the connect confirmation mails of a plurality of patterns having check patterns corresponding to the mail environment respectively are transmitted, thereby confirming the mail transmission route, and in case the connect confirmation mails of all the patterns are received, the connection success is responded as a diagnosis result, and in case there are connect confirmation mails not possible to receive, a message urging the change of the setup of the mail transmission environment, which makes the connect confirmation mails not possible to receive as receivable, may be transmitted as a diagnosis result. Further, the present invention includes suitable modifications without harming the object and the advantages of the invention, and further, is not subjected to the limit by the numerical values shown as above.

What is claimed is:

1. A remote maintenance system to report fault information to a maintenance center by an electronic mail through the internet when a fault is detected by a surveillance unit mounted in a user device, comprising:
 a connect confirmation unit to prepare connect confirmation mails of a plurality of patterns different in mail content including a mail size and transmit all the prepared mails sequentially to the maintenance center at a predetermined time before detecting the fault; and
 a diagnosis unit to diagnose the mail transmission environment including a limit size of the user device from a reception number of connect confirmation mails received from the user device within a predetermined time-out period after a first connect confirmation mail is received and transmit a diagnosis result to the user device or an arbitrary address by an electronic mail,
 wherein the connect confirmation unit is provided in the user device and the diagnosis unit is provided in the maintenance center, and
 the connect confirmation unit transmits the connect confirmation mail prior to the start of the system operation.

2. The remote maintenance system according to the claim 1, wherein the connect confirmation unit prepares and transmits the connect confirmation mails of a plurality of patterns different in either of the presence or absence of a partitioned mail, a mail size, an attachment file size, the number of attachment files, the extension code of the attachment file name or the length of the attachment file name.

3. The remote maintenance system according to the claim 1, wherein the diagnosis unit, when possible to receive the connect confirmation mails of all the patterns from among the connect confirmation mails of a plurality of patterns transmitted from the user device, transmits a connect success as a diagnosis result, and when there are the connect confirmation mails not receivable, transmits a message urging the change of the setup of the mail transmission environment as a diagnosis result.

4. The remote maintenance system according to the claim 1,
 wherein the connect confirmation unit, in case the presence of a mail partition is set in the mail transmission environment, prepares and transmits a first connect confirmation mail attached no file having a size less than a predetermined partition size and a second connect confirmation mail attached with a file having a size more than a partition size,
 wherein the diagnosis unit, in case both the first connect confirmation mail and the second connect confirmation mail are possible to receive, transmits a connect success as a diagnosis result, and
 wherein the diagnosis unit, in case the first connect confirmation mail is received and the second connect confirmation mail is not possible to receive, transmits a setup change to no partitioned mail as a diagnosis result.

5. The remote maintenance system according to the claim 1,
 wherein the connect confirmation unit, in case the absence of a mail partition is set in the mail transmission environment, prepares and transmits the first connect confirmation mail attached with no file having a size of less than a predetermined portioned size and a third connect confirmation mail attached with a file having a sufficient size for the partition size,
 wherein the diagnosis unit, in case both of the first connect confirmation mail and the third connect confirmation mail are possible to receive, transmits a connect success as a diagnosis result and
 wherein the diagnosis unit, in case the first connect confirmation mail is possible to receive and the third connect confirmation mail is not possible to receive, transmits a setup change of the presence of the partitioned mail as a diagnosis result.

6. The remote maintenance system according to the claim 4,
 wherein the first connect confirmation mail is less than 64 Kb, the second connect confirmation mail is 64 to 128 Kb.

7. The remote maintenance system according to the claim 1, wherein the connect confirmation unit, in case a diagnosis result from the maintenance system is not possible to receive even when a predetermined period of time has passed after the connect confirmation mail is transmitted, outputs a message for urging the review of the mail transmission environment.

8. The remote maintenance system according to the claim 1, wherein the connect confirmation unit transmits the connect confirmation mail in association with a periodic report mail periodically transmitted.

9. The remote maintenance system according to the claim 1, wherein the connect confirmation unit transmits the connect confirmation mail in association with a fault occurrence mail transmitted by the fault detection of the user device.

10. The remote maintenance system according to the claim 5, wherein the first connect confirmation mail is less than 64 Kb, and the third connect confirmation mail is 2 Mb.

11. A mail connect confirmation method of a remote maintenance system to report fault information to a maintenance center by an electronic mail through the internet when detecting a fault by a surveillance unit mounted in a user device, comprising:
 a connect confirmation step of preparing connect confirmation mails of a plurality of patterns different in mail content including a mail size and transmit all the prepared mails sequentially from the user device to the maintenance center at predetermined time before detecting the fault; and
 a diagnosing step of diagnosing the mail transmission environment including a limit size of the user device from a reception number of connect confirmation mails received from the user device within a predetermined time-out period after a first connect confirmation mail is received and transmitting the diagnosis result to the user device or an arbitrary address by the electronic mail at the maintenance center,
 wherein the connect confirmation step transmits the connect confirmation mail prior to the start of the system operation.

12. The mail connect confirmation method of the remote maintenance system according to the claim 11, wherein the connect confirmation step prepares and transmits the connect confirmation mails of a plurality of patterns different in either of the presence or absence of a partitioned mail, a mail size, an attachment file size, the number of attachment files, the extension code of the attachment file name, the length of the attachment file name or the like.

13. The mail connect confirmation method of the remote maintenance system according to the claim 11, wherein the diagnosis step, in case the connect confirmation mails of all patterns are possible to receive from among the connect confirmation mails of a plurality of patterns transmitted from the user device, transmits a connect success as a diagnosis result, and in case there are the connect confirmation mails not receivable, transmits a message urging the change of the mail transmission environment as a diagnosis result.

14. The mail connect confirmation method of the remote maintenance system according to the claim 11,
wherein the connect confirmation step, in case the presence of the mail partition is set in the mail transmission environment, prepares and transmits a first connect confirmation mail attached with no file having a size of less than a predetermined partition size and a second connect confirmation mail attached with a file having a size more than the partition size,
wherein the diagnosis unit, in case both of the first connect confirmation mail and the second connect confirmation mail are possible to receive, transmits a connect success as a diagnosis result and
wherein the diagnosis unit, in case the first connect confirmation mail is possible to receive and the second connect confirmation mail is not possible to receive, transmits a setup change to no partitioned mail as a diagnosis result.

15. The mail connect confirmation method of the remote maintenance system according to the claim 11,
wherein the connect confirmation step, in case the absence of the mail partition is set in the mail transmission environment, prepares and transmits the first connect confirmation mail attached with no file having a size of less than a predetermined portioned size and the third connect confirmation mail attached with a file having a sufficient size for the partition size,
wherein the diagnosis unit, in case both of the first connect confirmation mail and the third connect confirmation mail are possible to receive, transmits a connect success as a diagnosis result and
wherein the diagnosis unit, in case the first connect confirmation mail is possible to receive and the third connect confirmation mail is not possible to receive, transmits a setup change to the presence of the partitioned mail as a diagnosis result.

16. A computer-readable storage medium which stores a program, allowing a computer of a user device which reports fault information to a maintenance center by an electronic mail through the internet when detecting a fault to execute;
a connect confirmation step of preparing connect confirmation mails of a plurality of patterns different in mail content including a mail size and transmit all the prepared mails sequentially from the user device to the maintenance center at predetermined time before detecting the fault, and
a diagnosis result reception step of receiving and displaying the diagnosis result of the mail transmission environment including a limit size of the user device based on a reception number, within a predetermined time-out period, of connect confirmation mails transmitted from the maintenance center,
wherein the connect confirmation step transmits the connect confirmation mail prior to the start of the system operation.

17. The storage medium according to the claim 16, wherein the connect confirmation step prepares and transmits the connect confirmation mails of a plurality of patterns different in either of the presence or absence of a partitioned mail, a mail size, an attachment file size, the number of attachment files, the extension code of the attachment file name or the length of the attachment file name.

18. The storage medium according to the claim 16, wherein the diagnosis result reception step receives the diagnosis result of a connect success in case the connect confirmation mails of all patterns are possible to receive from among the connect confirmation mails of a plurality of patterns transmitted from the user device or a diagnosis result of a message urging the setup change of the mail transmission environment in case there are the connect confirmation mails not possible to receive.

19. The storage medium according to the claim 16,
wherein the connect confirmation step, in case the presence of the mail partition is set in the mail transmission environment, prepares and transmits the first connect confirmation mail attached with no file having a size of less than a predetermined partition size and the second connect confirmation mail attached with a file having a size more than the partition size, and
wherein the diagnosis result reception step receives and displays a diagnosis result showing a connect success in case both of the first connect confirmation mail and the second connect confirmation mail are possible to receive, and a diagnosis result showing a setup change to no partitioned mail in case the first connect confirmation mail is possible to receive and the second connect confirmation mail is not possible to receive.

20. The storage medium according to the claim 16,
wherein the connect confirmation step prepares and transmits the first connect confirmation mail attached with no file having a size of less than a predetermined partition size and the third connect confirmation mail attached with a file having a sufficiently large size for the partition size in case no partitioned mail is set to the mail transmission environment,
wherein the diagnosis result reception step receives and displays a diagnosis result showing a connect success in case both of the first connect confirmation mail and the third connect confirmation mail are possible to receive, and a diagnosis result showing a setup change to the presence of the partitioned mail in case the first connect confirmation mail is possible to receive and the third connect confirmation mail is not possible to receive.

* * * * *